Figure 1:
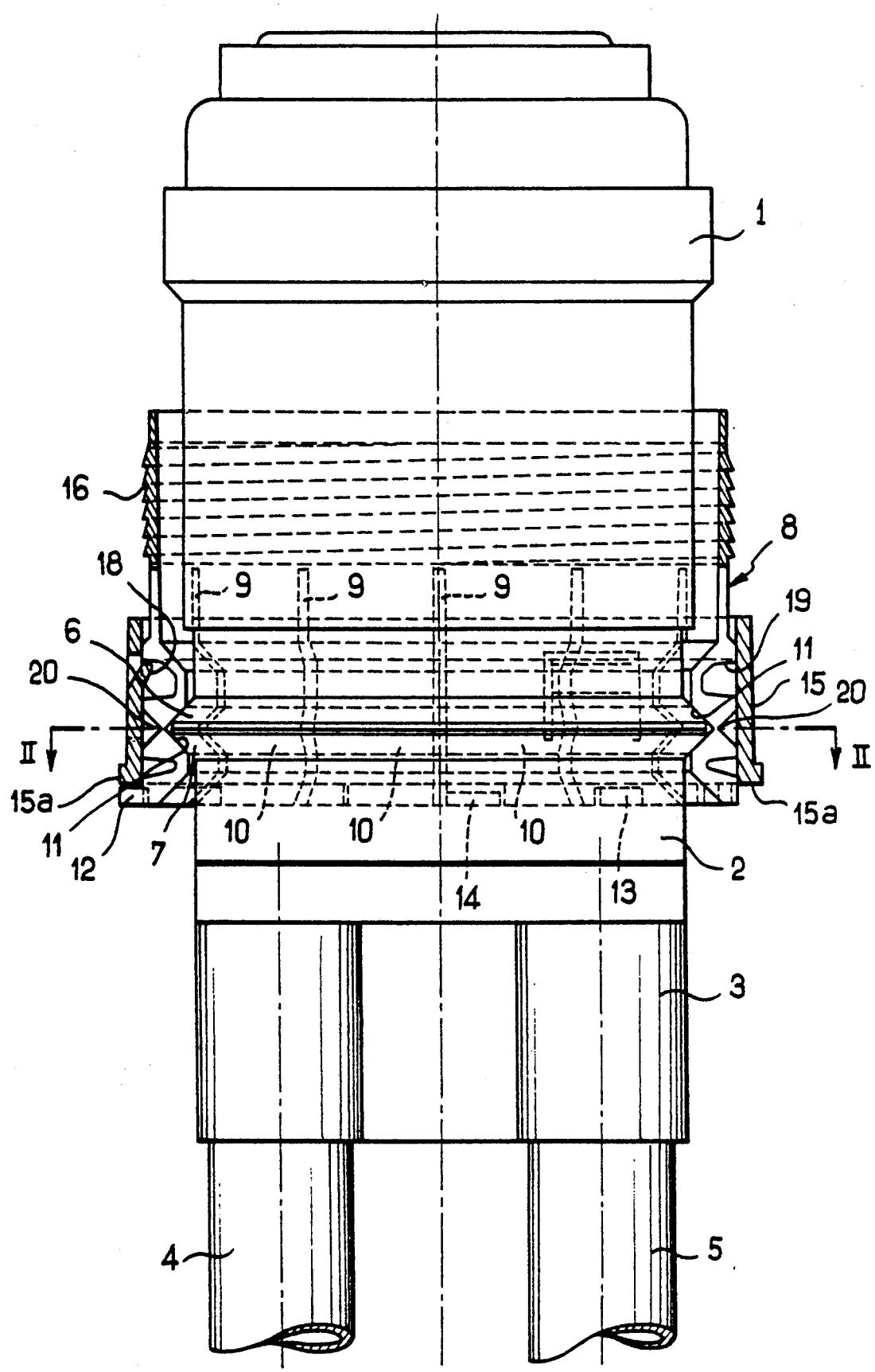

United States Patent [19]

Rappart et al.

[11] Patent Number: 4,995,643
[45] Date of Patent: Feb. 26, 1991

[54] DEVICE FOR FIXING A WATER METER ON TO A BASE AND METHOD RELATING THERETO

[75] Inventors: Alain Rappart, Lalbenque; Henri Loosdregt, Paris; Paul Pershon, Prechac; Philippe Persohn, Bazas, all of France

[73] Assignees: Manufacture d'Appareillage Electriquie de Cahors, Cahors; Lyonnaise des Eaux, Paris; Persohn S.A., Bazas, all of France

[21] Appl. No.: 407,439

[22] Filed: Sep. 14, 1989

[30] Foreign Application Priority Data

Sep. 16, 1988 [FR] France .................... 88 12095

[51] Int. Cl.$^5$ .......................................... F16L 35/00
[52] U.S. Cl. .......................................... 285/4; 285/30; 285/80; 285/86; 285/319
[58] Field of Search ................... 285/319, 4, 86, 30, 285/34, 35, 80, 315, 323, 324

[56] References Cited

U.S. PATENT DOCUMENTS

| 2,327,714 | 8/1943 | Iftiger, Sr. ............ | 285/315 X |
| 2,951,274 | 9/1960 | Elsner ................... | 285/315 X |
| 4,773,474 | 9/1988 | Stay ..................... | 285/319 X |

FOREIGN PATENT DOCUMENTS

| 2305743 | 8/1974 | Fed. Rep. of Germany . |
| 360241 | 4/1906 | France . |
| 1217490 | 5/1960 | France . |
| 2612278 | 9/1988 | France . |
| 2086514 | 5/1982 | United Kingdom . |

Primary Examiner—Randolph A. Reese
Assistant Examiner—Heather Chun
Attorney, Agent, or Firm—Young & Thompson

[57] ABSTRACT

Contact surfaces of a water meter (1) and a base (2) of a meter support (3) comprising a water inlet duct (4) and a water outlet duct (5) are each bordered by an annular shoulder (6, 7). An assembly ring (8) is provided so as to keep the two annular shoulders (6, 7) in contact, this ring (8) comprising slits (9) separating a series of elastic fingers (10). The ring (8) comprises moreover on its inner face an annular groove (11) complementing the two annular shoulders (6, 7). A rigid collar (15) force-fitted onto the elastic fingers (10) and bearing against outwardly projecting lugs (12) at the ends thereof keeps the annular groove (11) against the annular shoulders (6, 7) which are in contact.

12 Claims, 3 Drawing Sheets

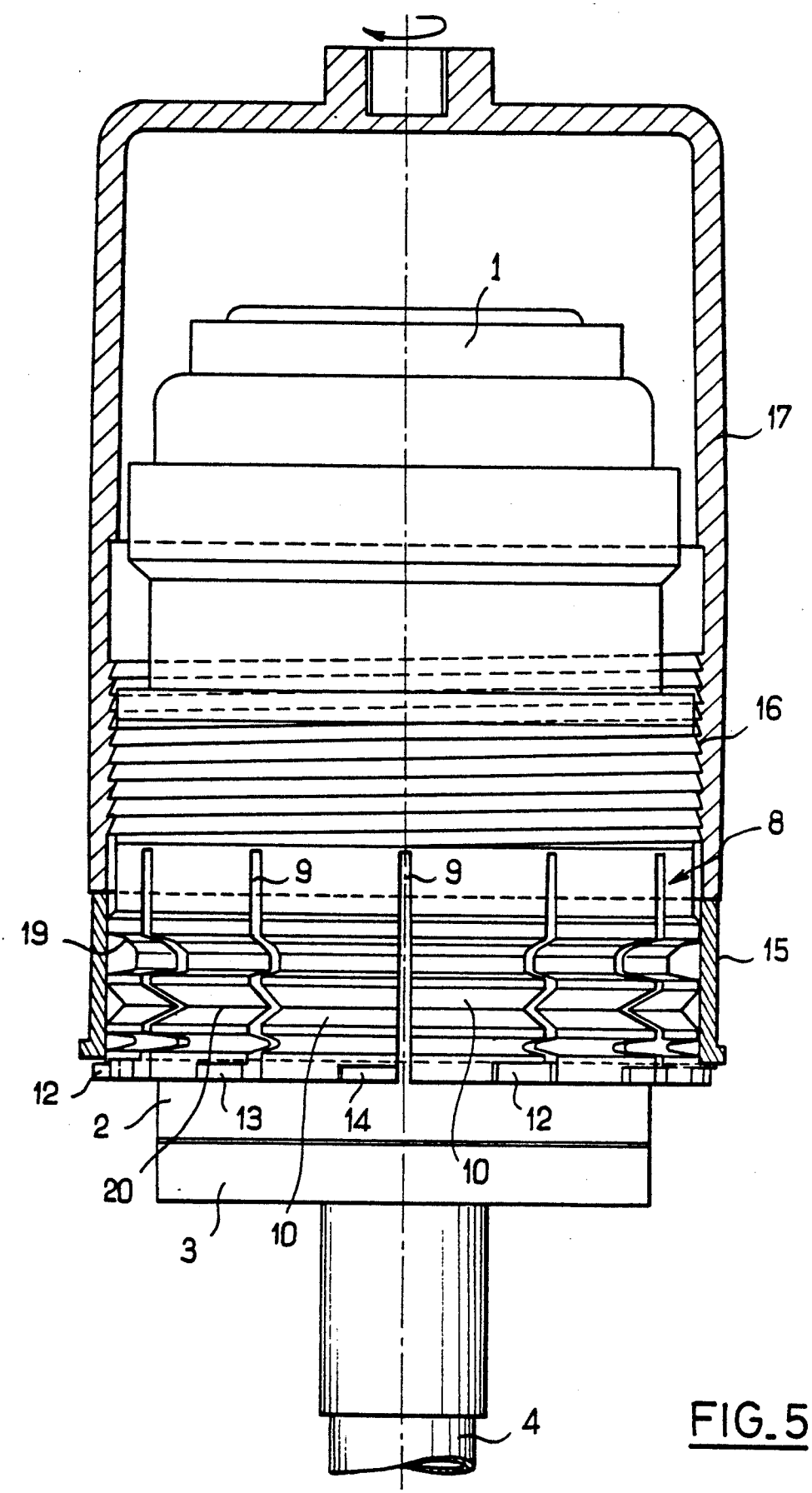
FIG_5

DEVICE FOR FIXING A WATER METER ON TO A BASE AND METHOD RELATING THERETO

The present invention relates to a device for fixing a water meter onto the base of a meter support comprising a water inlet duct and a water outlet duct.

The invention relates in particular to a device for fixing a water meter onto a rotating base such as that described in French patent application 87 03453 of Mar. 13, 1987 in the name of the Applicants.

The invention also relates to a method for mounting and removing the aforementioned device.

The object of the present invention is to create a device which enables the meter and the base to be easily assembled and which is tamper-proof.

According to the invention, in this device the contact surfaces of the water meter and the base are each bordered by an annular shoulder forming, when they are in contact, an annular projection, wherein an assembly ring engaged around the meter and the base is provided in order to keep the two annular shoulders in contact with each other, this ring comprising slits extending over a part of its length and separating from each other a series of elastic fingers distributed around the ring, this ring comprising moreover on its inner face an annular groove complementing the two annular shoulders in contact with each other, this groove being formed in the part of the ring having the elastic fingers, the end of this part of the ring comprising lugs projecting outwards and wherein a rigid collar force-fitted onto the part of the ring having the elastic fingers and bearing against the lugs keeps the annular groove formed on the inner face of these fingers against the annular shoulders of the meter and the base, which are in contact.

As a result of their elasticity, the fingers of the ring are able to bend outwards when this ring is mounted on the meter, such that the annular groove formed on the inner face of these fingers can click onto the shoulders of the meter and of the base which are in contact, such that the latter are pressed against each other.

The rigid collar inserted over these fingers keeps the annular groove pressed against the two shoulders, such that the ring cannot in practice be removed other than by breaking the fingers.

According to an advantageous embodiment of the invention, the assembly ring comprises in its non-slitted part opposite the lugs a threaded zone onto which a sleeve for fixing the collar and enabling the latter to be pushed towards the lugs can be screwed.

This sleeve facilitates mounting of the collar on the ring.

According to a preferred version of the invention, the collar comprises on its inner face elastic projections which, when the collar is mounted, can click elastically into a hollow formed on the outer surface of the ring.

Thus, the ring is locked axially in both directions on the one hand by the lugs and on the other hand by the elastic projections clicked into the hollow of the ring. Consequently the collar cannot be withdrawn.

According to an advantageous feature of the invention, the ring comprises in the region of its annular groove a zone of reduced thickness defining a line of breakage of the elastic fingers when the collar is pushed onto the lugs of these fingers with a force exceeding a predetermined value.

Thus, in order to remove the meter, it is sufficient to push on the collar by force-screwing the sleeve until the fingers break in the region of the breakage zone. The fact that the meter cannot be removed other than by breaking the fingers of the ring ensures that assembly of the meter on the base is completely tamperproof.

According to another feature of the invention, the method for fixing a water meter on a rotating base comprises the following stages:

the meter is placed on the base such that their annular shoulders are in contact, the assembly ring is engaged onto the meter and, by bending its elastic fingers outwards, the two annular shoulders which are in contact are overlaid by the annular groove formed on the inner face of the fingers, the collar is inserted over the ring until its edge rests on certain lugs formed at the ends of the fingers of the ring.

In order to remove the assembly ring, the sleeve is force-screwed towards the collar until the force of its edge against the lugs causes breakage of the finger along the zone of reduced thickness formed in the region of the annular groove which overlays the shoulders of the meter and the base.

Other features and advantages of the invention will emerge further from the description below.

Figure 4:
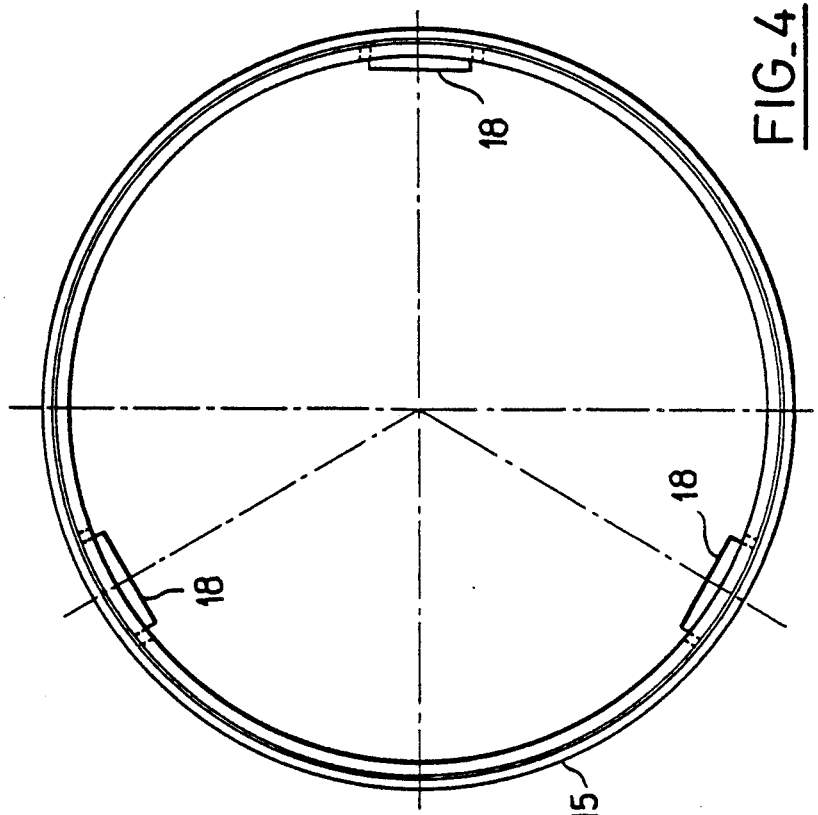
Figure 2:
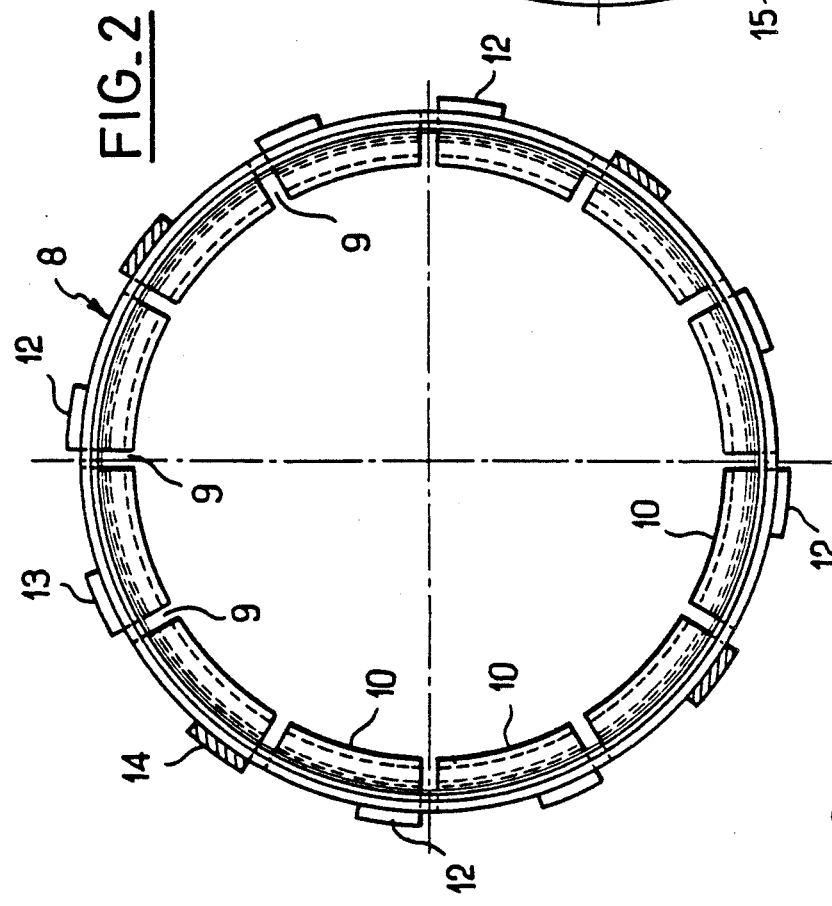
Figure 3:
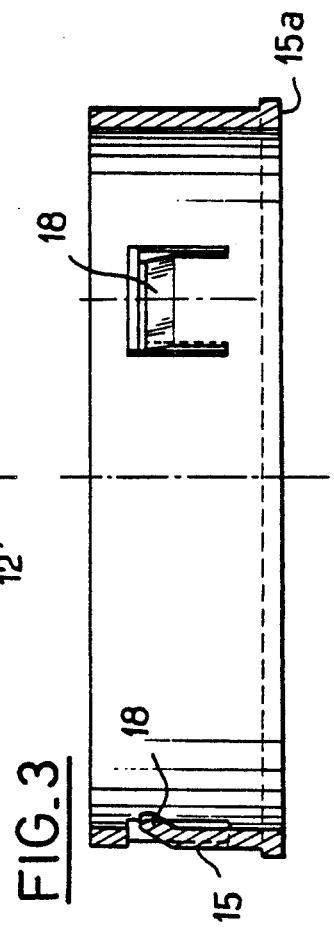

In the accompanying drawings provided by way of non-limiting examples:

FIG. 1 is an elevation view of a water meter in position on a base and assembled by means of a device according to the invention shown sectioned along an axial plane, FIG. 2 is a sectional view of the assembly ring along the plane II-II of FIG. 1, FIG. 3 is a sectional view along an axial plane of the collar for fixing the ring, FIG. 4 is a plan view of the collar, FIG. 5 is an elevation view of the meter, the base and the ring mounted on them and a longitudinally sectioned view of the fixing sleeve screwed onto the ring and bearing against the collar also sectioned.

The embodiment of FIG. 1 shows a water meter 1 fixed onto the rotating base 2 of a meter support 3 comprising a water inlet duct 4 and a water outlet duct 5. By rotating the meter 1 and the base 2 on the support 3, the water flow can be opened and closed. Such an embodiment has been described in French patent application 87 03453 of Mar. 13, 1987 in the names of the Applicants.

The contact surfaces of the water meter 1 and the base 2 are each bordered by an annular shoulder 6, 7 forming, when they are in contact, an annular projection with a V-shaped cross-section.

These shoulders 6, 7 each form an angle of 45° with the contact surface of the meter 1 and the base 2. An assembly ring 8 engaged around the meter 1 and the base 2 is provided in order to keep the two annular shoulders 6, 7 in contact with each other. This ring 8 comprises slits 9 extending over a part of its length and separating from one another a series of elastic fingers 10 distributed around the ring 8. The ring 8 comprises moreover on its inner face an annular groove 11 complementing the two annular shoulders 6, 7 in contact with each other. This groove 11 is formed in the part of the ring 8 having the elastic fingers 10. The end of this part of the ring comprises lugs 12, 13, 14 (see also FIG. 2) projecting outwards. A rigid collar 15 force-fitted onto the part of the ring 8 having elastic fingers 10 and bearing against the lugs 12 keeps the annular groove 11 formed on the inner face of these fingers 10 against the annular shoulders 6, 7 of the meter 1 and the base 2, which are in contact.

Moreover, the assembly ring 8 comprises in its non-slitted part opposite the lugs 12, 13, 14 a threaded zone 16 onto which can be screwed a sleeve 17 for fixing the collar 15 (see FIG. 5) and enabling the latter to be pushed against the lugs.

The collar 15 comprises on its inner face elastic projections 18 in the form of tongues (see FIG. 3) which, when the collar 15 is mounted, can click elastically into an annular hollow 19 formed on the external surface of the ring 8.

The ring 8 comprises in the region of its annular groove 11 a zone of reduced thickness 20 defining a line of breakage of the elastic fingers 10 when the collar 15 is pushed onto the lugs 12, 13, 14 of these fingers 10 with a force exceeding a predetermined value. In the example shown, each elastic finger 10 carries a lug 12, 13 or 14.

As shown in FIG. 1, when the collar 15 is in its normal assembly position, its edge 15a rests only on certain lugs 12, while other lugs 13, 14 are slightly removed from the edge 15a of the collar 15.

In the example shown (see FIG. 2), the ring 8 comprises twelve elastic fingers 10 regularly distributed around the ring 8.

When the collar 15 is in the normal assembly position, its edge 15a rests on four lugs 12 arranged at 90° relative to each other. Between these lugs 12 there are arranged two lugs 13, 14 located at a distance from the edge 15a of the collar 15, one 14 being further spaced than the other 13. The lug 13 is for example at 0.5 mm from the edge 15a and the other 14 at 1 mm from this edge.

The lug 14 furthest spaced is the one situated further forward than the other 13 relative to the direction of screwing of the sleeve 17.

It can be seen furthermore, in FIG. 2, that the lugs 12, 13, 14 are situated close to the slits 9 which separate the elastic fingers 10.

A description now follows of the method for fixing the water meter 1 onto the rotating base 2 of the support 3 by means of the aforementioned fixing device. This method comprises the following stages:

the meter 1 is placed on the base 2 such that their annular shoulders 6, 7 are in contact, the assembly ring 8 is engaged onto the meter 1 and, by bending its elastic fingers 10 outwards, the two annular shoulders 6, 7 which are in contact are overlaid by the annular groove 11 formed on the inner face of the fingers 10, the collar 15 is inserted over the ring 8 until its edge 15a rests on the lugs 12 formed at the ends of the fingers 10 of the ring 8.

According to a preferred version of the invention, the sleeve 17 is used. For this purpose, the sleeve 17 is screwed onto the threaded part 16 of the ring 8 so as to push the collar 15 towards the lugs 12, 13, 14 until the elastic projections 18 of this collar 15 click into the annular hollow 19 of the ring 8.

In order to remove the assembly ring 8, the sleeve 17 is force-screwed towards the collar 15 until the force of its edge 15a against the lugs 12, then the lug 13 and then the lug 14 causes breakage of the fingers 10 along the zone of reduced thickness 20 formed in the region of the annular groove 11 which overlies the shoulders 6, 7 of the meter 1 and the base 2.

Since the lugs 12, 13 and 14 are situated at different distances progressively increasing from the edge 15a of the collar 15 and the lugs are situated close to the slits 9 and not in the middle of the fingers 10, breakage of the latter occurs progressively in three successive stages, thereby enabling the tightening torque of the sleeve 17 to be kept to a moderate value, in order to obtain breakage of the fingers 10.

Of course, the choice of material forming the ring 8 must be compatible with achieving the aforementioned result. The said material must in fact be both elastic and brittle.

Steel has these properties, as well as synthetic materials chosen for their high tensile strength and low breaking elongation.

Once the fingers 10 have been broken, the ring 8 and the collar 15 can be withdrawn. The meter 1 can then be removed from the base 2.

The main advantage of the fixing device described above is that it is tamper-proof. In fact, in order to remove the meter, it is necessary to break the fingers 10. Thus, a non-authorized user cannot remove the meter himself for example in order to change illegally the number of units used displayed on this meter.

Of course, the invention is not limited to the example of embodiment described above and numerous modifications may be made to it without departing from the scope of the invention.

We claim:

1. A device for fixing a water meter (1) onto the base (2) of a meter support (3) comprising a water inlet duct (4) and a water outlet duct (5), wherein the contact surfaces of the water meter (1) and the base (2) are each bordered by an annular shoulder (6, 7) forming, when they are in contact, an annular projection, wherein an assembly ring (8) engaged around the meter and the base is provided in order to keep the two annular shoulders (6, 7) in contact with each other, this ring (8) comprising slits (9) extending over a part of its length and separating from each other a series of elastic fingers (10) distributed around the ring, this ring (8) comprising moreover on its inner face an annular groove (11) complementing the two annular shoulders (6, 7) in contact with each other, this groove (11) being formed in the part of the ring having the elastic fingers (10), the end of this part of the ring comprising lugs (12, 13, 14) projecting radially outwards and wherein a rigid collar (15) force-fitted onto the part of the ring having the elastic fingers (10) and bearing against the lugs (12) keeps the annular groove (11) formed on the inner face of these fingers (10) against the annular shoulders (6, 7) of the meter (1) and the base (2) which are in contact, and wherein the assembly ring (8) comprises in its non-slitted part opposite the lugs (12, 13, 14) a threaded zone (16) onto which can be threaded a sleeve (17) for retaining the collar (15) on the assembly ring (8) and for pushing the latter towards the lugs (12, 13, 14).

2. The device as claimed in claim 1, wherein the collar (15) comprises on its inner face elastic projections (18) which, when the collar (15) is mounted, can click elastically into a hollow (19) formed on the outer surface of the ring (8).

3. The device as claimed in claim 1, wherein the ring (8) comprises in the region of its annular groove (11) a zone of reduced thickness (20) defining a line of breakage of the elastic fingers (10) when the collar (15) is pushed onto the lugs (12, 13, 14) of these fingers with a force exceeding a predetermined value.

4. The device as claimed in claim 1, wherein each elastic finger (10) carries a lug (12, 13 or 14).

5. The device as claimed in claim 4, wherein when the collar (15) is in the normal assembly position, its edge (15a) rests only on certain lugs (12) while other lugs (13, 14) are slightly spaced from the edge (15a) of the collar.

6. The device as claimed in claim 5 wherein when the ring (15) is in the normal assembly position its edge rests on four lugs (12) arranged at 90° relative to each other and wherein between these lugs (12) there are arranged two lugs (13, 14) located at a distance from the edge (15a) of the collar, one (14) being further spaced than the other (13).

7. The device as claimed in claim 6, wherein the furthest spaced lug (14) is the one situated further forward than the other (13) relative to the direction of threading.

8. The device as claimed in claim 1, wherein the ring (8) comprises twelve elastic fingers (10) regularly distributed around the ring.

9. The device as claimed in claim 1, wherein the lugs (12, 13, 14) are situated close to the slits (9) which separate the elastic fingers (10).

10. A method of for fixing a water meter (1) onto a base (2) of a meter support (3) comprising a water inlet duct (4) and a water outlet duct (5), wherein the contact surfaces of the water meter (1) and the base (2) are each bordered by an annular shoulder (6, 7) forming, when they are in contact, an annular projection, wherein an assembly ring (8) engaged around the meter and the base is provided in order to keep the two annular shoulders (6, 7) in contact with each other, this ring (8) comprising slits (9) extending over a part of its length and separating from each other a series of elastic fingers (10) distributed around the ring, this ring (8) comprising moreover on its inner face an annular groove (11) complementing the two annular shoulders (6, 7) in contact with each other, this groove (11) being formed in the part of the ring having the elastic fingers (10), the end of this part of the ring comprising lugs (12, 13, 14) projecting radially outwards and wherein a rigid collar (15) force-fitted onto the part of the ring having the elastic fingers (10) and bearing against the lugs (12) keeps the annular groove (11) formed on the inner face of these fingers (10) against the annular shoulders (6, 7) of the meter (1) and the base (2) which are in contact, the method comprising the following stages:

placing the meter (1) on the base (2) such that their annular shoulders (6, 7) are in contact, engaging the assembly ring (8) onto the meter (1) and, by bending said elastic fingers (10) outwards, fitting said fingers (10) over the two annular shoulders (6, 7) which are in contact until said shoulders (6, 7) are overlaid by the annular groove (11) formed on the inner face of the fingers (10), and inserting the collar (15) over the ring (8) until its edge (15a) rests on certain lugs (12) formed at the ends of the fingers (10) of the ring (8).

11. The method as claimed in claim 10, in which a sleeve (17) and the collar (15) are used, wherein the sleeve (17) is screwed onto the threaded part (16) of the ring (8) so as to push the collar (15) towards the lugs (12, 13, 14) until the elastic projections (18) of this collar click into the hollow (19) of the ring (8).

12. The method as claimed in claim 10, in which a ring (8) is used, wherein, in order to remove the assembly ring (8), the sleeve (17) is force-screwed towards the collar (15) until the force of its edge (15a) against the lugs (12, 13, 14) causes breakage of a fingers (10) along the zone of reduced thickness (20) formed in the region of the annular groove (11) which overlays the shoulders (6, 7) of the meter and the base.

* * * * *